Aug. 14, 1934.    J. HANSEN    1,969,979
CLAY BURNING FURNACE
Original Filed April 26, 1927    2 Sheets-Sheet 2
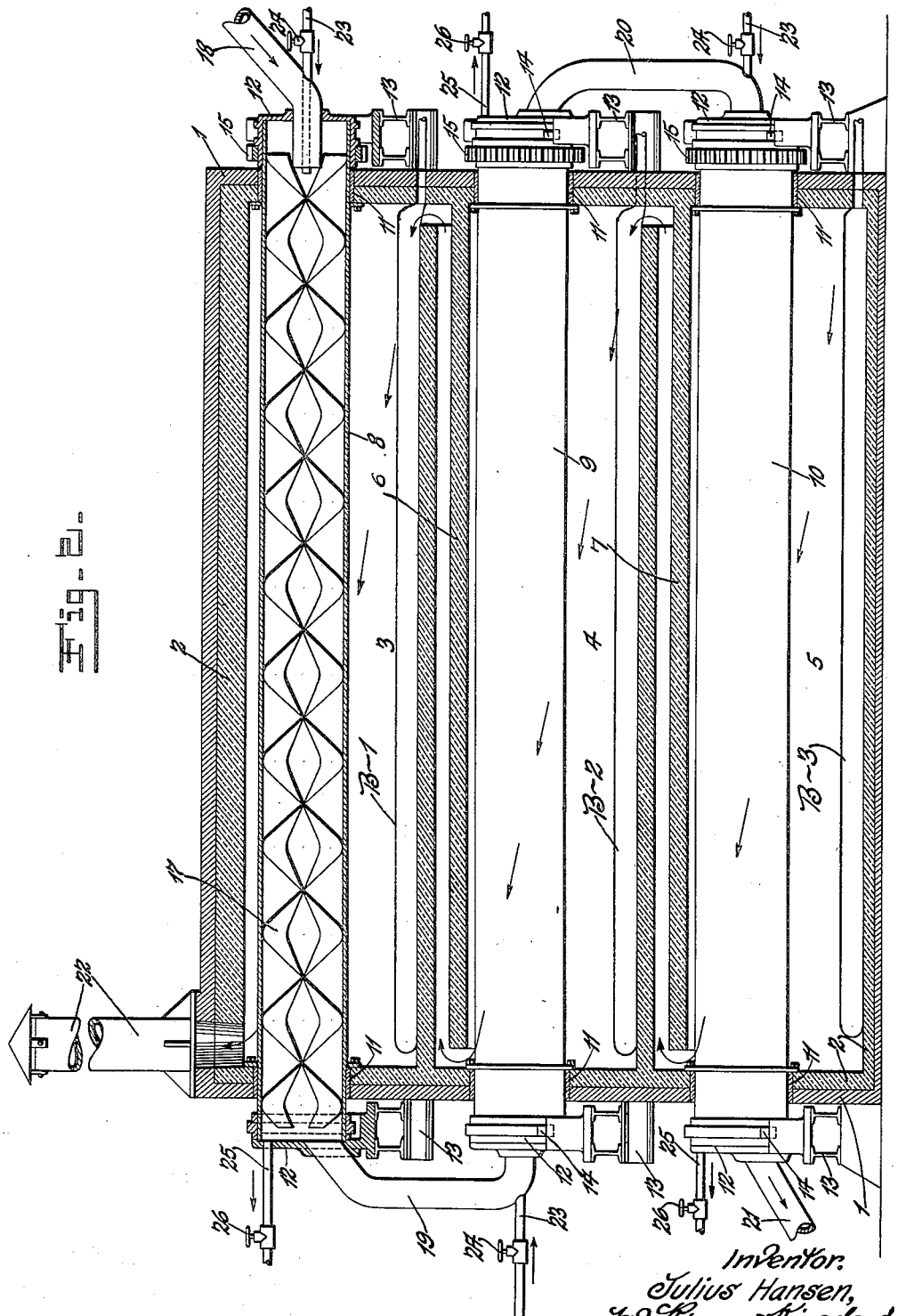
Inventor:
Julius Hansen,
by Rippey Kingsland.
His Attorneys.

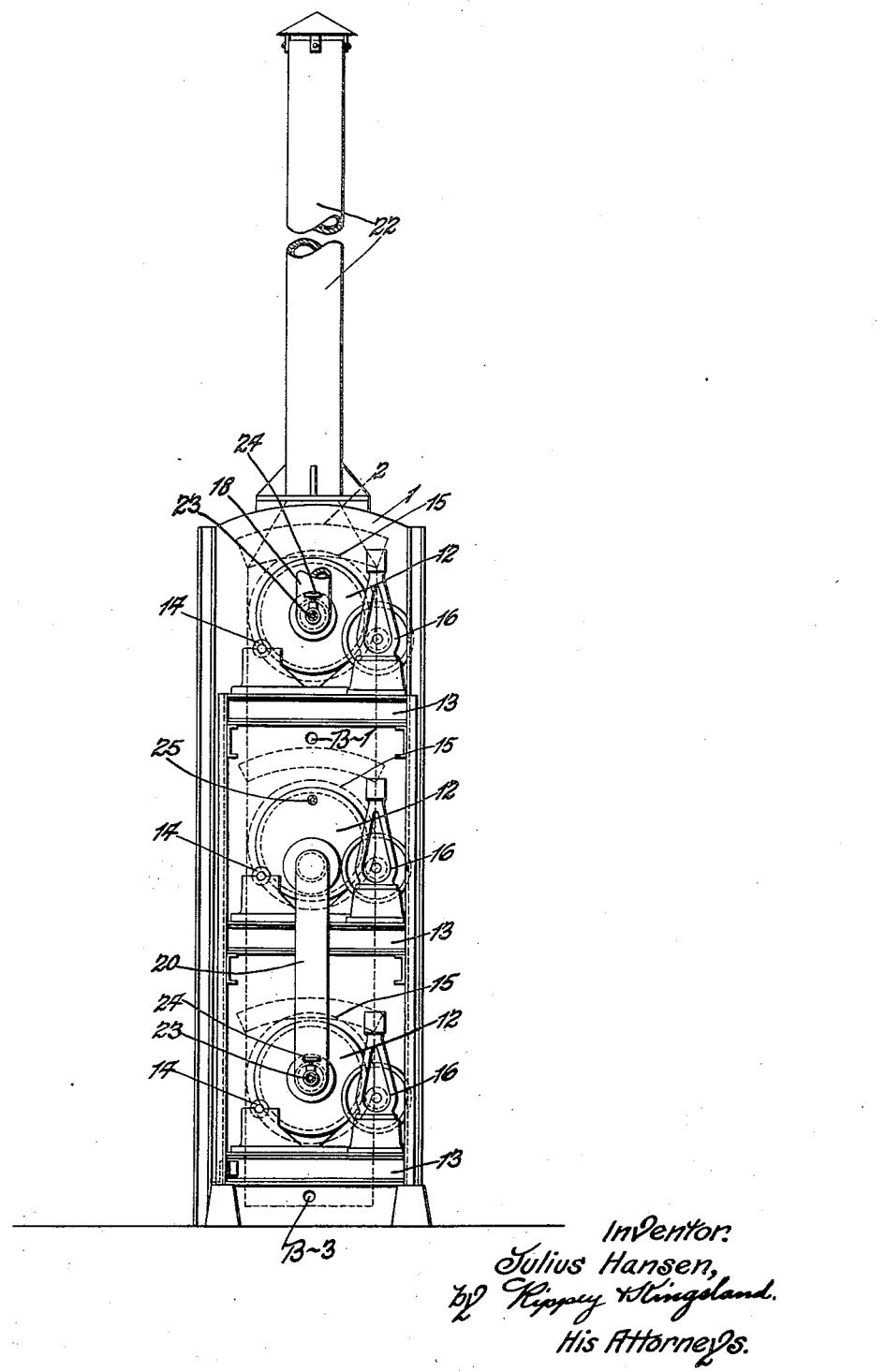

Patented Aug. 14, 1934

1,969,979

UNITED STATES PATENT OFFICE 1,969,979

CLAY BURNING FURNACE

Julius Hansen, Madison County, Ill., assignor to Shell Petroleum Corporation, a corporation of Virginia Application April 26, 1927, Serial No. 186,762
Renewed July 2, 1934

6 Claims. (Cl. 202—86)

This invention relates to improvements in clay burning furnaces, and consists of the novel construction hereinafter disclosed.

In the art of purifying oils by the contact filter process it is known that the clay used may be regenerated after use by removing the entrained materials and then subjected to a calcining treatment.

Considerable difficulty in the art has been experienced in connection with the calcining or burning of the clay, for the reason that the clay is in a very finely comminuted state, so that, when it is burned in an ordinary furnace, there is a loss of bulk, as a substantial percentage of the clay is drawn out by the draft in the furnace.

Furthermore, by the use of the known burners, a considerable quantity of carbon is formed and mixed with the clay during the calcining process. The admixture of the carbon with the clay tends to deteriorate the clay as a filtering medium.

Furthermore, in the use of the known burners, on account of the relatively high temperature to which the clay is subjected in the calcining process, there is a material deterioration of the apparatus used in burning the clay.

It is an object of the present invention to provide a clay burning furnace in which the clay may be calcined without loss of material and in which provision is made for the removal of the carbon deposits from the body of clay during the calcining process.

Another object of the invention is to provide a clay burning furnace that may be economically maintained.

More specifically, the object of the invention is to provide a clay burning furnace having a plurality of drums in which the clay is progressively burned at increasing degrees of temperature with provision whereby the drums may be independently heated and in which the time of treatment in each drum may be independently controlled.

Another object of the invention is to provide an independent air system for each drum whereby the carbon formed during the calcining process is removed from the clay body so that the ultimate product will be substantially free from carbon deposits.

The foregoing advantages, as well as additional advantages apparent to those skilled in the art, are attained by the construction hereinafter disclosed, reference being made to the accompanying drawings, in which Fig. 1 is an end elevation of the furnace.

Fig. 2 is a vertical section through the furnace, the upper drum being shown in vertical section.

In the embodiment of the invention illustrated in the drawings the furnace is shown as including an outer shell or casing 1 substantially rectangular in form and of any suitable dimensions, dependent upon the determined capacity of the burner. The entire casing is lined with a lining 2, preferably of some refractory material and can conveniently be made of fire brick. The internal chamber thus formed is divided into a series of compartments 3, 4 and 5 by spaced series of baffle walls 6 and 7, the walls 6 and 7 being so disposed as to direct the heated gases alternately from end to end of the furnace chamber.

Extending longitudinally through each of the compartments 3, 4 and 5 is a drum, designated respectively 8, 9 and 10. Each of the drums extends exteriorly of the end walls of the casing 1 and through bushings 11 in said end walls, said bushings forming expansion joints for sealing the space between the openings in the casing that accommodate the drum extremities. For each drum and at each end thereof and exteriorly of the end walls of the casing are heads 12 into which the respective ends of the drum fit. The heads 12 constitute bearings for the extremities of the drums, the heads in turn being supported by supporting structure 13, so as to hold the drums in alinement and to provide a mounting for each drum whereby the drums are permitted to rotate. In order to reduce friction and to permit the drums to readily rotate roller bearing supports 14 arranged at each end of the drums may be provided, if desired.

It will be understood that the specific construction relating to the mounting of the drums is not material so long as the drums are arranged for rotation, and in such a manner that the connections hereinafter described may be accommodated.

In order to provide for the rotation of the drums, each is provided with a gear wheel 15 driven by any suitable form of independently controlled driving means diagrammatically illustrated and indicated by 16 on the drawings. It will be understood that the power means for driving the drums are each independent of the other, and may be separately controlled in order that predetermined speeds of rotation may be imparted to the separate drums.

Each drum is provided with a suitable form of conveyor means, that illustrated in the drawings comprising helical vanes 17 mounted on the interior wall of each drum, the conveyors being so arranged that the material is advanced from end to end in opposite directions through the adjacent drums.

The material to be treated is fed into the drum 8 through a supply pipe 18 that may be connected with a hopper or other point of material supply, said pipe 18 extending through one of the heads of the drum 8. As the drum 8 is rotated, the material is advanced through the drum and is discharged into a pipe 19 connected into the opposite head of the drum 8 and passes through the pipe 19 into the drum 9 from which it is advanced in counter direction by the rotation of the drum 9, and then discharged in a connecting pipe 20 that delivers the material from the drum 9 to the drum 10 through which it passes, and from which it is discharged through a discharge pipe 21.

It will be understood that each of the drums is heated by an independent burner, designated on the drawings as B—1, B—2 and B—3. As the drums are arranged in vertical series in compartments of the furnace, the heat applied to the lower drum circulates through the compartment in which said lower drum is mounted and passes between the baffle wall 7 and into the next or intermediate compartment, from whence it passes into the upper compartment from which the spent gases leave the furnace through a flue 22. This arrangement takes advantage of the fuel heating efficiency of the individual burners.

In practice, for the treatment of the clay, a range of temperatures of approximately 500 degrees Fahrenheit for the upper drum, 750 degrees Fahrenheit for the intermediate drum, and 1000 degrees Fahrenheit for the lower drum have been found to be satisfactory, the time to which the clay is subjected to the different heat treatments being controlled by the independent rotation of the several drums.

In order to prevent the formation of carbon deposits, each drum is provided with an air system that comprises an air inlet pipe 23, the air inlet pipes being arranged at alternate ends of the respective drums. Each inlet pipe is provided with a valve 24 whereby the draft admitted to each drum is independently controlled. The air inlet pipes enter directly into the adjacent heads of the drums and discharge a forced draft of air approximately in alinement with the axis of the drum, the air affording a sufficient amount of oxygen to promote the combustion of substantially all of the carbon clay material. Whatever deposit is formed in the separate drums is withdrawn through outlet pipes 25 connected into the respective drums at the ends opposite to the air inlets. The outlet pipe may be connected with an exhauster of a known type, if desired. Each outlet pipe 25 is provided with a valve 26. By manipulation of the valves 24 and the valves 26 the proper amount of air admitted and withdrawn is controlled, so that, by adjustment, practically all of the carbon is burned or removed, leaving the mass of clay ultimately discharged from the furnace substantially free from any deposits that would decrease the filtering characteristics of the clay.

Another advantage accruing from the arrangement of the separate drums is that a relatively large quantity of material may be treated, either by a batch or continuous process, by gradually increasing the heat of the mass, thus conserving heat units applied to the furnace. Furthermore, as the relatively high final temperature is applied only to the lower drum, the maintenance of the equipment is more economical than where the material is all heated in one unit to which the high temperature is applied.

I am aware that the invention may be modified in various particulars without departure from the spirit and scope thereof, and what I claim and desire to secure by Letters Patent is:—

1. A clay burning furnace comprising a rotatable heating chamber, an air inlet passage in the chamber arranged substantially coaxially with the chamber, an air exhaust passage in alinement with the inlet passage and positioned at the opposite end of said chamber, and valves for controlling the inlet and outlet passages respectively whereby a controlled current of air may be admitted to and exhausted from said heating chamber.

2. A furnace adapted to calcine clay impregnated with hydrocarbon comprising a rotatable heating chamber, an air inlet passage in the chamber entering the same at one end and substantially co-axial with the chamber, an exhaust passage from the chamber at the opposite end substantially in alinement with the inlet passage whereby a current of air may be admitted to and discharged from the heating chamber to prevent the formation of carbon, and means for controlling the air inlet and exhaust passages independently whereby the required volume of air admitted and exhausted from the chamber may be controlled.

3. A furnace comprising a casing divided into a superimposed series of compartments, rotatable drums in said compartments respectively, means for feeding material to be calcined through said drums consecutively in counter directions, independent heating means for said drums located exteriorly of the walls thereof, and an independent means for admitting and exhausting air to and from each of said drums whereby a controlled current of air may be passed longitudinally through the same.

4. A clay burning furnace including a rotatable drum having stationary heads at opposite ends, means for exteriorly heating said drum, an air inlet passage at one end of said drum, an air outlet passage at the opposite end of said drum, and valves for controlling said inlet and outlet passages respectively whereby a controlled current of air may be passed through a drum and exhausted therefrom to remove and prevent carbon deposits resulting from heating of the clay.

5. A clay burning furnace including a rotatable drum having stationary heads at opposite ends, means for heating the drum, an air inlet passage at one end of said drum, an air outlet passage at the opposite end of said drum, and independent means for controlling the admission and outlet of air respectively whereby a controlled current of air may be passed through the drum and exhausted therefrom to remove carbon deposits caused by heating of the clay.

6. A furnace comprising a series of superimposed parallel rotatable drums, independent heating means for each of said drums, mechanical means operable upon rotation of the drums to advance material therethrough, connections for coupling adjacent ends of said drums for progressively advancing material therethrough, independent driving means for controlling the speed of rotation of each of said drums, and independent means for admitting and exhausting air to and from each of said drums.

JULIUS HANSEN.